US008395656B1

(12) United States Patent
Malzbender et al.

(10) Patent No.: US 8,395,656 B1
(45) Date of Patent: Mar. 12, 2013

(54) METHODS AND APPARATUS TO DIRECT ATTENTION IN A VIDEO CONTENT DISPLAY

(75) Inventors: Thomas G. Malzbender, Palo Alto, CA (US); Daniel George Gelb, Redwood City, CA (US); Ramin Samadani, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 258 days.

(21) Appl. No.: 13/012,776

(22) Filed: Jan. 24, 2011

(51) Int. Cl.
*H04N 7/14* (2006.01)

(52) U.S. Cl. ............... 348/14.16; 348/14.08; 348/14.12

(58) Field of Classification Search .... 348/14.01–14.16, 348/333.12, 333.03, 369; 715/764, 762; 345/158, 44

See application file for complete search history.

(56) References Cited

U.S. PATENT DOCUMENTS

| 6,825,859 | B1 | 11/2004 | Severenuk et al. | |
|---|---|---|---|---|
| 7,129,981 | B2 | 10/2006 | Berstis | |
| 2003/0086610 | A1* | 5/2003 | Luo et al. | 382/182 |
| 2004/0227699 | A1 | 11/2004 | Mitchell | |
| 2010/0056274 | A1* | 3/2010 | Uusitalo et al. | 463/31 |
| 2010/0064010 | A1* | 3/2010 | Alkov et al. | 709/206 |

FOREIGN PATENT DOCUMENTS

| JP | 11352944 | 12/1999 |
|---|---|---|
| WO | WO2009059380 | 5/2009 |

OTHER PUBLICATIONS

Mendez, et al. "Experiences on Attention Direction through manipulation of Salient Features," PIVE Proceedings, Mar. 21, 2010 (6 pages).
Li, et al. "Spatiotemporal Sensitivity and Visual Attention for Efficient Rendering of Dynamic Environments," Aug. 2000 (102 pages).
McNamara, et al. "Improving Search Task Performance Using Subtle Gaze Direction," 2008 (5 pages).
Sundstedt, et al. "A Psychophysical Study of Fixation Behavior in a Computer Game," 2008 (7 pages).
McKee, et al. "Discrimination of time: comparison of foveal and peripheral sensitivity," Nov. 10, 1983 (8 pages).
Kim, et al. "Saliency-guided Enhancement for Volume Visualization," IEEE Transactions on Visualization and Computer Graphics, vol. 12, No. 5, Sep./Oct. 2006 (8 Pages).
Kosara, et al. "Semantic Depth of Field," 2001 (8 Pages).
DeCarlo, et al. "Stylization and Abstraction of Photographs," Department of Computer Science & Center for Cognitive Science Rutgers University, 2002 (8 Pages).
Bailey, et al. "Subtle Gaze Direction," 2009 (1 Page).
Glenn E. Mitchell II. "Taking Control Over Depth of Field," Using the Lens Blur Filter in Adobe Photoshop CS, 2004 (9 Pages).

* cited by examiner

*Primary Examiner* — Melur Ramakrishnaiah

(57) ABSTRACT

Methods and apparatus to direct attention in a video content display are disclosed. An example method to direct attention in a video content display, includes determining a location in a display interface to which attention is to be directed based on video content to be displayed, and modulating with a stimulus, at a frequency such that the stimulus is detectable by human peripheral vision and is less detectable by human foveal vision, a portion of the video content displayed in the location with a stimulus to direct attention to the location.

20 Claims, 11 Drawing Sheets

METHODS AND APPARATUS TO DIRECT ATTENTION IN A VIDEO CONTENT DISPLAY

BACKGROUND

The human eye may be segmented into two regions generally having different capabilities: the foveal (center) region and the peripheral (outer) region. The human fovea has higher visual acuity but has different temporal acuity from the peripheral region.

DETAILED DESCRIPTION

In video software applications that may potentially have multiple events occurring on-screen at the same time, the attention of a user of the application may not be focused on the most pertinent activity. For example, video conferencing applications may have several users, notifications, and/or visual controls displayed on the screen concurrently, any of which may attract a user's attention away from a current speaker.

Prior approaches to attracting a user's attention in a video display include noticeably altering the display of the video to highlight a section of the video display or to diminish other sections of the video display. These overt methods may be distracting to the user, especially when an incorrect portion of the display is highlighted or diminished (e.g., by automatic activity detection algorithms). Subtler approaches to attracting the user's attention use eye tracking methods to determine where on the screen the user's eye is fixated and modifying a region of the computer screen lying in the user's peripheral vision. When the user attempts to focus on the modified region, the eye tracker identifies movement toward the region and removes the modification of the display, leaving the user to view the desired region unmodified. However, users who do not have eye tracking equipment may not effectively use such methods.

Example methods and apparatus described herein may be used to direct attention in a video content display. In some examples, the methods and apparatus direct attention to a desired region in a video display in a subtle manner so that a person viewing the video content display is not aware that his or her attention is being directed to the region by an external cause. Some example methods and apparatus described herein determine a region or area of the video display to which a user's attention is to be drawn based on alarms and/or alerts, activity detected in received video content, a user gaze history, and/or other information associated with received video content. When such a region or aspect has been determined, example methods and apparatus modify (e.g., modulate the video content of) the region or area with a stimulus at a frequency between 30 Hertz (Hz) to 70 Hz to subtly direct attention to the region or area. Some example methods and apparatus direct attention by changing a luminance in a portion of the screen to which attention is to be directed. In some examples, the changes in luminance manifest as a rapid and intermittent change in luminance or brightness, also referred to herein as "flicker."

As used herein, the term "video content" may refer to any combination of visual content, audio content, and/or auxiliary information accompanying visual and/or audio content.

Figure 1A:
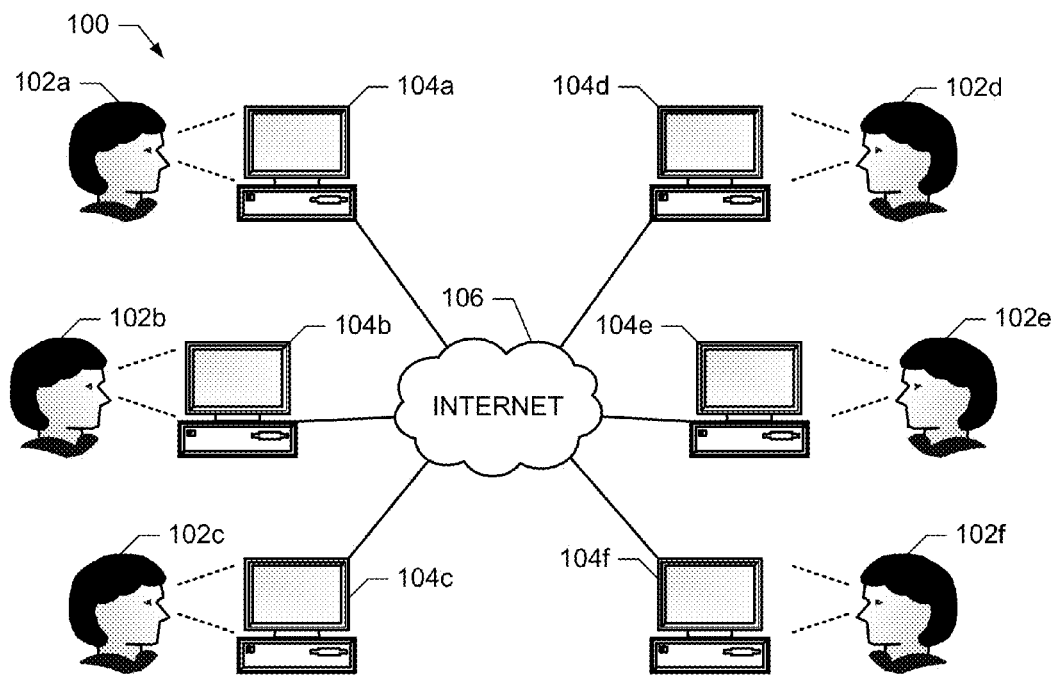
FIG. 1A is a schematic diagram of an example system to present video content to a user.

FIG. 1 is a schematic diagram of an example system 100 to present video content to a user 102a-102f. The example system 100 includes multiple video content presentation devices 104a, 104b, 104c, 104d, 104e, 104f (e.g., computers, video-enabled mobile devices, or other types of processing and/or display devices) that are communicatively coupled via a network 106. The example network 106 illustrated in FIG. 1A includes the Internet, although any other corporate intranet, wireless and/or wired local area network, and/or any other type of network may be used in addition or as an alternative to the illustrated network 106. Additionally, each of the video content devices 104-104f may be used by any of the user(s) 102a-102f.

Figure 1B:
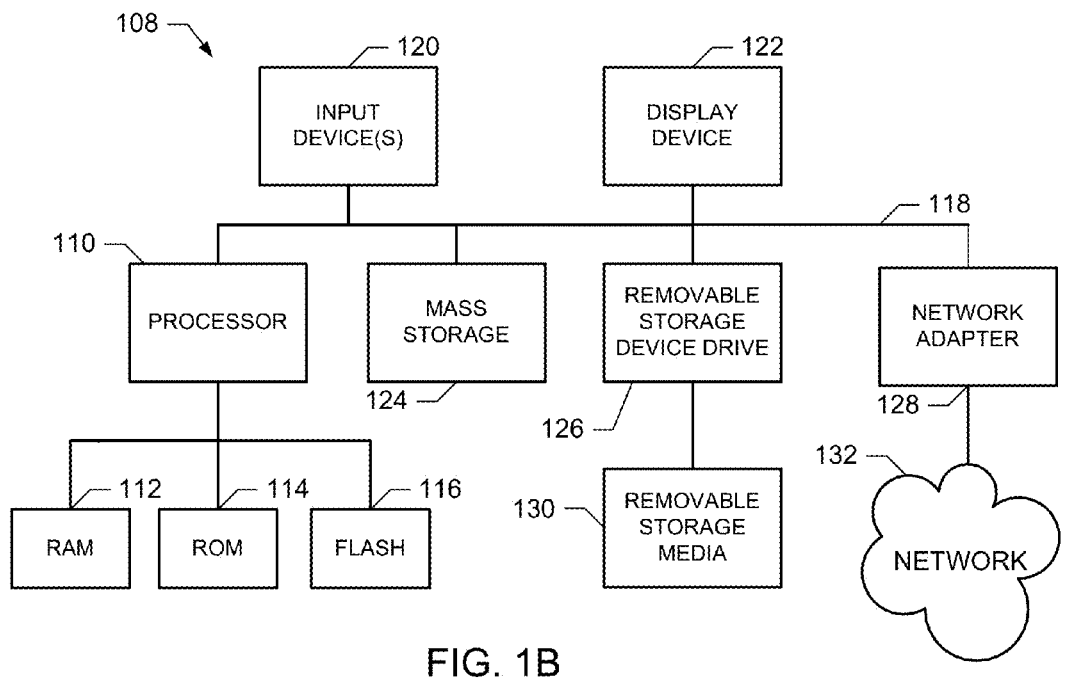
FIG. 1B is a diagram of an example processor system that may be used to implement any of the video content presentation devices of FIG. 1 to direct attention in a video display.

FIG. 1B is a diagram of an example processor system 108 that may be used to implement any of the video content presentation devices 104a-104f to direct attention in a video display. The example processor system 108 includes a processor 110 having associated memories, such as a random access memory (RAM) 112, a read only memory (ROM) 114 and a flash memory 116. The processor 110 is coupled to an interface, such as a bus 118 to which other components may be interfaced. In the illustrated example, the components interfaced to the bus 118 include input device(s) 120, a display device 122, a mass storage device 124, a removable storage device drive 126, and a network adapter 128. The removable storage device drive 126 may include associated removable storage media 130 such as magnetic or optical media. The network adapter 128 may connect the processor system 108 to an external network 132, such as the Internet 106 of FIG. 1A.

The example processor system 108 may be, for example, a conventional desktop personal computer, a notebook computer, a workstation or any other computing device. The processor 110 may be any type of processing unit, such as a microprocessor. The memories 112, 114 and 116 that are coupled to the processor 110 may be any suitable memory devices and may be sized to fit the storage demands of the system 108. In particular, the flash memory 116 may be a non-volatile memory that is accessed and erased on a block-by-block basis.

The input device(s) 120 may be implemented using a keyboard, a mouse, a touch screen, a track pad, a barcode scanner and/or any other device that enables a user to provide information to the processor 110. In particular, the input device(s) 120 may advantageously include a camera device to capture video of the user 102. The processor 110 may process the captured video and transmit the video to the other video content presentation devices 104b-104f for display. The example input device(s) 120 may also include a microphone so that each user 102a-102f may audibly participate in a video content presentation. Sound captured by the microphone may be digitized by the processor 110 (or other audio processing device) and sent to the other video content presentation devices 104b-104f. As described in more detail below, the example input device(s) 120 may include a gaze (or eye) tracker. The gaze tracker determines at which portion of the display device 122 a user 102a-102f is gazing. Based on an input from a gaze tracker, the processor 110 may determine to what area of and/or portion of video content displayed on the display device 122 a user's attention is currently directed.

The display device 122 may be, for example, a liquid crystal display (LCD) monitor, a cathode ray tube (CRT) monitor or any other suitable device that acts as an interface between the processor 110 and a user. The display device 122 of FIG. 1B includes any additional hardware required to interface a display screen to the processor 110. The display device 122 displays video of other users of the video content presentation devices 104b-104f that may be sending video.

The mass storage device 124 may be, for example, a conventional hard drive or any other magnetic, optical, or solid state media that is readable by the processor 110. The removable storage device drive 126 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive and/or a solid state universal serial bus (USB) storage drive. The removable storage media 130 is complimentary to the removable storage device drive 126. For example, if the removable storage device drive 126 is an optical drive, the removable storage media 130 may be a CD-R disk, a CD-RW disk, a DVD disk or any other suitable optical disk. On the other hand, if the removable storage device drive 126 is a magnetic media device, the removable storage media 130 may be, for example, a diskette or any other suitable magnetic storage media.

The network adapter 128 may be, for example, an Ethernet adapter, a wireless local area network (LAN) adapter, a telephony modem, or any other device that allows the processor system 108 to communicate with other processor systems over a network. The external network 132 may be a LAN, a wide area network (WAN), a wireless network, or any type of network capable of communicating with the processor system 108. Example networks may include the Internet, an intranet, and/or an ad hoc network.

Figure 2:
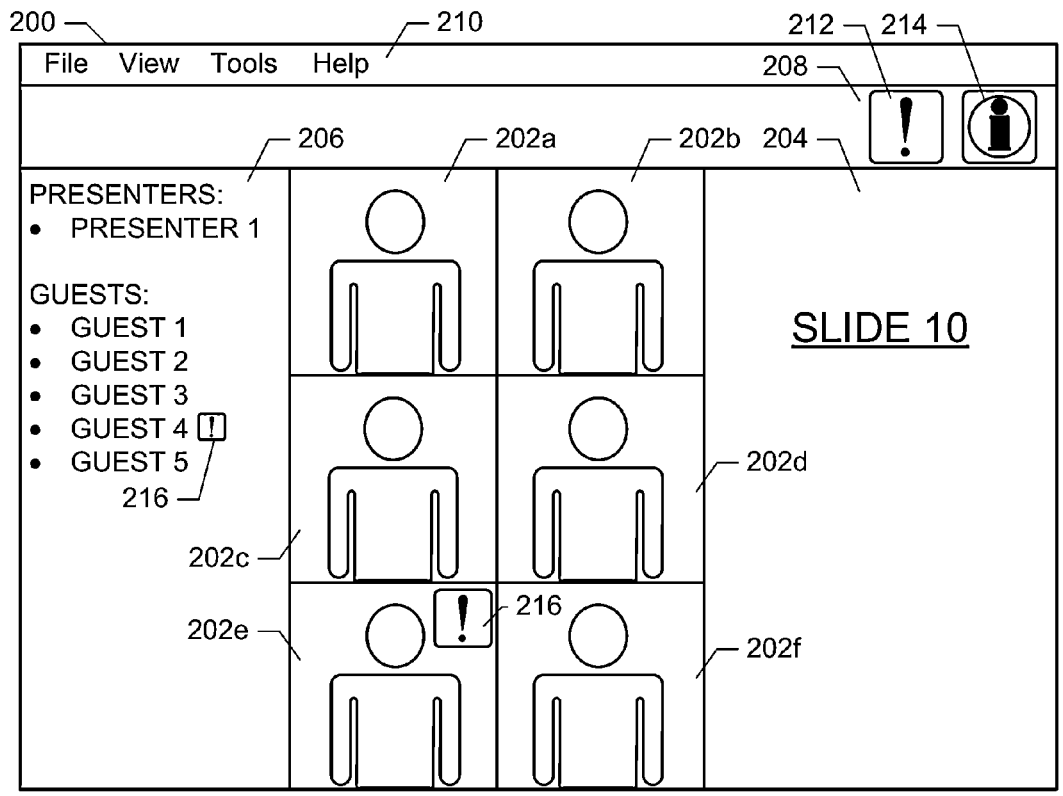
FIG. 2 illustrates an example display interface displaying video content that may be presented to a user.

FIG. 2 illustrates an example display interface 200 displaying video content that may be presented to a user (e.g., the users 102a-102f of FIG. 1). The example user interface 200 may be implemented on any of the example video content presentation devices 104a-104f and/or the example processing system 108 of FIG. 1B.

The example display interface 200 of FIG. 2 includes multiple video feeds 202a-202f to display video content, such as video of other user(s) 102a-102f transmitted to the display interface 200 from other video content presentation devices 104a-104f. The video feeds 202a-202f may be independently updated from individually-received video content and/or may be updated based on a common video feed. The example display interface 200 further includes a common content window 204 (e.g., to show content, activities, or material that are to be shown or provided to each user 102a-102f using a respective video content presentation device 104), a status window 206 (e.g., to show a status of the video feed, such as the number and/or identification of users observing the video feed), an actions menu 208 (e.g., to provide the user 102 with actions that may be invoked to affect the video feed or the other users), and a toolbar 210 (e.g., to provide the user with options to control the display interface 200). Other types of application components may also be used.

The example status window 206 shows a current status of an example application on the display interface 200. The illustrated status window 206 shows a current list of participants, including presenters and guests, in a video conferencing application. The example actions menu 208 includes an "Attention Requested" (e.g., "Raise Hand") button 212 that requests attention from other participants and an information button 214 that provides information about an item in the interface 200. The "Attention Requested" button 212 may cause an attention indicator 216 to be associated with a video feed (e.g., the video feed 202e) and/or with a participant in the status window 206. The example toolbar 210 is a menu that includes standard and/or application-specific features.

Figure 3:
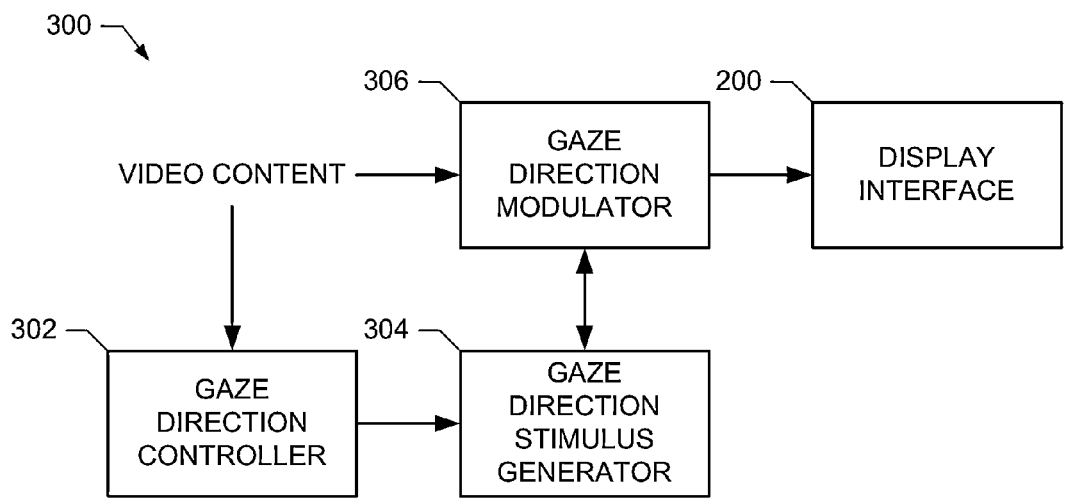
FIG. 3 is a block diagram of an example video content presentation device to direct attention in a video content display.

FIG. 3 is a block diagram of an example video content presentation device 300 to direct attention in a video content display. The example video content presentation device 300 receives video content, selectively modifies the video content (e.g., an area or portion of the video content) to direct attention to a particular portion of the video content, and displays the video content on a display interface (e.g., the display interface 200 of FIG. 2). To direct attention to a portion of the video content, the example video content presentation device 300 includes a gaze direction controller 302, a gaze direction stimulus generator 304, a gaze direction modulator 306, and the display interface 200.

The gaze direction controller 302 determines a location in the display interface 200 to which a gaze is to be directed. The gaze direction controller 302 provides the determined location (e.g., coordinates and radius, an area, etc.) to the gaze direction stimulus generator 304. The gaze direction controller 302 may determine a location in the display interface 200 based on, for example, an alarm or alert generated by the display interface 200. The alarm or alert may be used to visually alert a user to a change in the status of the video display, such as the addition or withdrawal of a video feed. In examples involving a video conferencing application, the gaze direction controller 302 may direct a presenter's attention to a timer indicating an amount of time the presenter has remaining.

In another example, the gaze direction controller 302 may determine the portion of the display interface 200 to which a person's gaze is to be directed based on a predetermined presentation choreography. A presentation choreography may include the times and identifications of active presenters or materials during a presentation. For example, if users corresponding to the video feeds 202a and 202b of the example display interface 200 of FIG. 2 are making a presentation using the common content window 204, the presentation choreography may include the time(s) during which user 202a should have the attention, the time(s) during which the user 202b should have the attention, and the time(s) during which attention should be directed to the common content window 204.

The gaze direction controller 302 may additionally or alternatively determine the portion of the display interface 200 from the "Attention Requested" button. For example, the gaze direction controller 302 may determine that attention is to be directed to the video feed 202e of FIG. 2 because a user associated with the video feed 202e has requested attention.

The gaze direction stimulus generator 304 receives the location from the gaze direction controller 302 and generates a stimulus to attract attention to the location. In general, the example gaze direction stimulus generator 304 generates a video stimulus that is to be readily detectable by human peripheral vision but less detectable by human foveal vision.

Foveal vision refers to the central portion of the human field of vision. In particular, the foveal vision uses a part of the human eye that has a high concentration of cones (color-sensitive cells) and a high visual spatial acuity. In contrast, peripheral vision uses a part of the eye that has a lower concentration of cones but which has more rods (light-sensitive cells, in the sense of light versus darkness). While peripheral vision has lower visual acuity than foveal vision, peripheral vision is more sensitive to motion and provides a faster reaction to rapid movement.

In some examples, the gaze direction stimulus generator 304 generates a gaze direction stimulus by generating successive stimuli images and/or image modifications which, when used to modulate successive images of video content, create a flicker effect in a portion or area of the video content that is easily observable or detectable by human peripheral vision and less observable or unobservable by human foveal vision. In particular, modulation of the video content with the stimuli changes the luminance (or other aspect) of the display at a frequency within a range of frequencies. For example, human foveal vision is generally unable to perceive luminance flicker at frequencies above about 40 Hertz (Hz), where a cycle refers to one light-dark-light (or dark-light-dark, neutral-light-neutral-dark-neutral, neutral-dark-neutral-light-neutral, etc.) transition (using luminance flicker as an example). This frequency may change between different individuals, and in some cases may be as low as 30 Hz. The example gaze direction stimulus generator 304 of FIG. 3 generates a 30-70 Hz luminance flicker around the determined location. Many display interfaces use refresh rates higher than 30 frames per second (fps) (e.g., 30 Hz). Thus, the gaze direction stimulus generator 304 may generate a luminance stimulus based on the refresh rate used by the display interface 200 so that the modulation (e.g., cycle) frequency remains between 30-70 Hz. Each cycle may require at least two values of luminance. As a result, the refresh rate may be required to be at least 60 Hz (e.g., twice the desired modulation or cycle frequency). Accordingly, the gaze direction stimulus generator 304 may generate and/or update the gaze direction stimulus to correspond to a refresh rate of the display interface and/or to correspond to a video content data rate. The size(s) and location(s) of the video feed(s) 202a-202f, the common content window 204, the status window 206, and/or the attention indicator 216 are provided to the gaze direction stimulus generator 304 by the gaze direction controller 302 and/or the gaze direction modulator 306 so the gaze direction generator 304 can accurately locate a stimulus for a region and/or object of interest.

When the stimulus (or the area of the video content that is modified based on the stimulus) is within a person's peripheral vision, the person will observe or perceive motion and his or her attention will be drawn toward the location where he or she believed the motion (e.g., flicker) to be located. In some examples (e.g., at some frequencies that may depend on the user), the flicker is sufficiently subtle so as to be subconsciously perceptible to the user. However, when the person gazes directly (e.g., using foveal vision) at the location of the stimulus in an attempt to resolve the motion, the person is unable to recognize any distortion in the display interface (e.g., cannot observe or perceive the stimulus). In some examples, the stimulus area is less than the foveal area at a given distance from the display interface 200 or the display device 122. Thus, when a person looks at the stimulus area using foveal vision, the stimulus area is contained within the foveal vision of the person and, thus, the stimulus (e.g., flickering) is substantially less noticeable or unobservable. However, the containment of the stimulus area to the foveal vision area is dependent on the distance between the person and the display interface 200 or the display device 122 because the foveal vision covers a percentage of the field of vision (e.g., degrees of arc) and not an absolute area (e.g., square inches).

The intensity and, thus, the noticeability and/or subtlety of the stimulus may be adjusted by the gaze direction stimulus generator 304 by, for example, adjusting the variation in luminance applied to the video content. For example, the gaze direction stimulus generator 304 may increase the intensity and decrease the subtlety of the gaze direction stimulus by increasing the range or amplitude of luminance (e.g., contrast between upper luminance and lower luminance) or decreasing the frequency of modulation of the video content with the gaze direction stimulus. Conversely, the gaze direction stimulus generator 304 may decrease the intensity and increase the subtlety of the gaze direction stimulus by increasing the frequency of modulation of the video content with the stimulus and/or decreasing the range or amplitude of luminance.

In some examples, the gaze direction stimulus generator 304 determines a gaze direction stimulus based on the desired flicker frequency and the refresh rate of the display device 122. For example, the gaze direction stimulus generator 304 of FIG. 3 determines a flicker waveform representative of the luminance values to be used in the gaze direction stimuli. If the gaze direction stimuli are to include two luminance values (including or in addition to a neutral luminance), the example gaze direction stimulus generator 304 may use a square flicker waveform having a frequency equal to the desired flicker frequency. In another example, if the gaze direction stimuli has a range of potential luminance, the example gaze direction stimulus generator may use a sine, sawtooth, or ramp flicker waveform having a frequency equal to the desired flicker frequency. The example gaze direction stimulus generator 304 samples the generated flicker waveform to determine the luminance with which to generate the gaze direction stimulus. In some examples, the gaze direction stimulus generator 304 modifies the sampling frequency to increase and/or reduce observability of the gaze direction stimulus by the user.

The gaze direction stimulus generator 304 provides the gaze direction stimulus (e.g., display data representative of luminance flicker) to the gaze direction modulator 306. The gaze direction modulator 306 receives the stimulus and the video content (e.g., from other video content presentation devices), combines (e.g., modulates) the video content with the gaze direction stimulus and presents the modulated video content via the display interface 200. To modulate the video content with the gaze direction stimulus, the example gaze direction modulator 306 renders the video data of the received video content (e.g., pixel color and/or luminance information) via an application for displaying the video content (e.g., a video conferencing application) and the display interface 200. In some examples, the gaze direction modulator 306 may also display video content based on an application or program for which the video content is intended. For example, the gaze direction modulator 306 may arrange the video content feeds 202a-202f based on a video conferencing application.

In the display interface 200 illustrated in FIG. 2, the received video content is fitted into the video feeds 202a-202f. The video feeds 202a-202f may change in size and/or location based on the number of video feeds 202a-202f. The example gaze direction modulator 306 then modifies the video content using the gaze direction stimulus. For example, if the gaze direction stimulus for a particular frame increases the luminance of a particular portion of the display interface 200, the gaze direction modulator 306 combines the gaze direction stimulus with the video content to increase the luminance in the corresponding area of the video content, and displays the video content modulated with the stimulus via the display interface 200.

The example gaze direction controller 302, gaze direction stimulus generator 304, and gaze direction modulator 306 may continue to modify and display the modified video content via the display interface 200 to attract attention to particular regions (e.g., video content portion(s)) of the display interface 200. The gaze direction stimulus generator 304 and the gaze direction modulator 306 may iteratively generate the gaze direction stimulus and modulate the gaze direction stimulus with the received video content while the gaze direction controller 302 maintains a constant gaze direction location. The gaze direction controller 302 may also change the gaze direction location from a first location to a second location in response to an action (e.g., a choreographed change from one video feed to another, an alarm or alert, etc.), in which case the gaze direction stimulus generator 304 generates the gaze direction stimulus for the second location.

While the example gaze direction stimulus generator 304 of FIG. 3 changes the luminance of a display interface to direct attention, other changes to the example display interface 200 may additionally or alternatively be used. For example, the gaze direction stimulus generator 304 of FIG. 3 may alter (e.g., flicker) the colors of a portion of the display interface 200 at a flicker frequency to direct attention to or away from the altered portions of the display interface 200.

Figure 4:
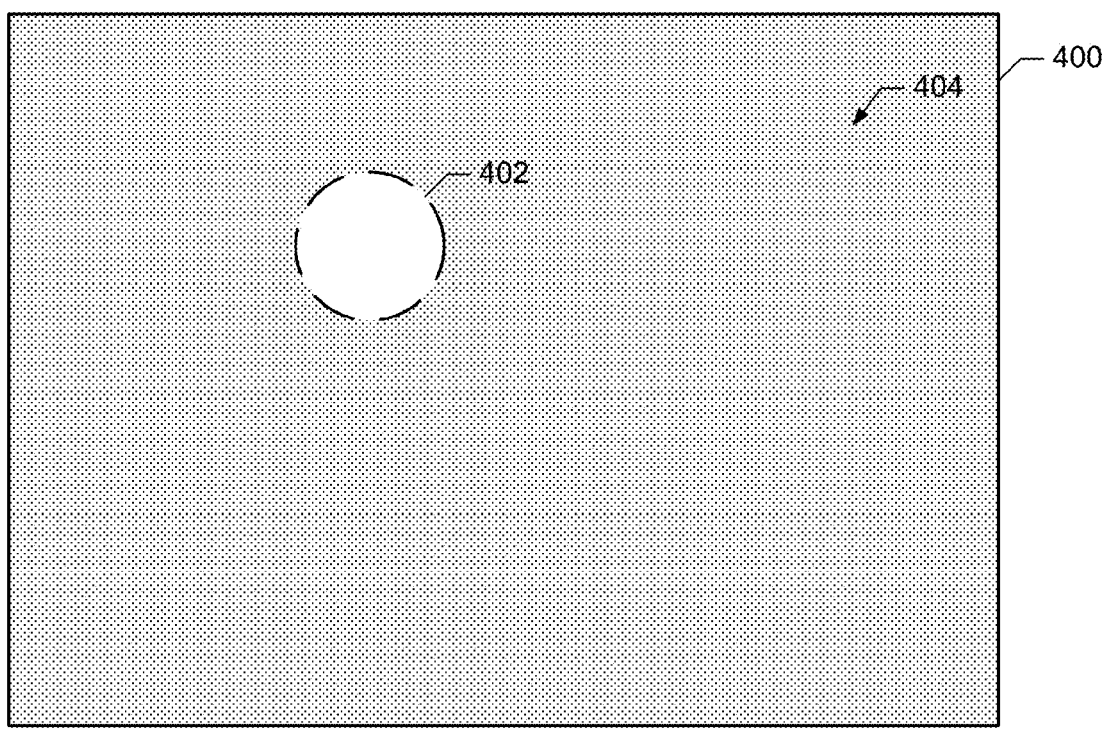
FIG. 4 illustrates an example gaze direction stimulus that may be generated by the gaze direction stimulus generator of FIG. 3.

FIG. 4 illustrates an example gaze direction stimulus 400 that may be generated by the gaze direction stimulus generator 304 of FIG. 3. As described in more detail below, the example gaze direction stimulus 400 may be alternated with other gaze direction stimuli for modulation with a video content signal to cause a flicker effect when viewed by human peripheral vision. The example gaze direction stimulus 400 includes an area 402 in which the luminance is temporarily higher than the remainder 404 of the stimulus 400. The area 402 is selected by the gaze direction controller 302 and provided to the gaze direction stimulus generator 304. The remainder 404 may be a neutral luminance (e.g., no change to the luminance, an average luminance of a display interface, a predetermined neutral luminance, etc.), while the area 402 has a luminance that is higher than the neutral luminance (e.g., a predetermined high luminance, a luminance that is higher than the average luminance, etc.). The example gaze direction stimulus 400 may be combined in sequence with other gaze direction stimuli such that the average luminance of the area 402 over time is equal or substantially equal to the average or neutral luminance of the remainder 404.

While the illustrated area 402 of FIG. 4 has a consistent luminance that is higher than the neutral luminance, the area 402 may instead have a decreased luminance relative to the neutral luminance, a luminance that gradually increases in luminance from the outer part of the area 402 toward the center of the area 402, and/or a luminance that gradually decreases from the outer part of the area 402 to the center. The example area 402 changes between at least two different luminances (e.g., higher and lower luminance, higher and neutral luminance, lower and neutral luminance, gradually increasing and gradually decreasing luminance, gradually increasing and neutral luminance, gradually decreasing and neutral luminance, etc.) to generate a stimulus. In some examples, a neutral-luminance stimulus may be used as a complementary stimulus to the stimulus 400. Any combination of different stimuli may be used to produce a luminance flicker effect.

Figure 5:
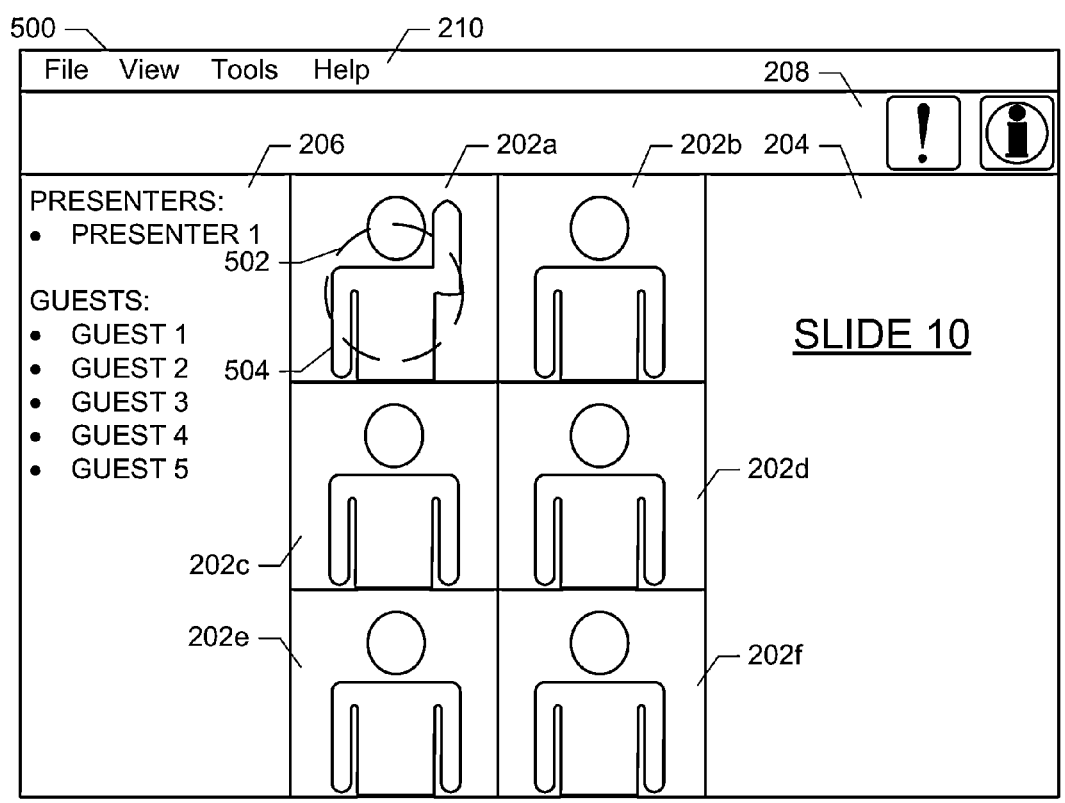
FIG. 5 illustrates an example of directing attention in a display interface at a first time by modulating video content with a stimulus in the display interface.

FIG. 5 illustrates an example of directing attention in a display interface 500 at a first time t by modulating video content with a stimulus in an area 502 of the display interface 500. The example stimulus may include all or a portion of the example stimulus 400 of FIG. 4. In particular, the example area 502 may correspond to the area 402 having a different luminance than the remainder 404 of the stimulus 400. The display interface 500 illustrated in FIG. 5 includes the example video feeds 202a-202f, the example control window 204, the example status window 206, the example actions menu 208, and the example toolbar 210 of FIG. 2. The example video feed 202a includes a presenter 504 who is presenting and may be speaking and/or performing some visible action. Due to the stimulus, the example area 502 has a higher luminance than other regions of the display interface 500.

To generate the example display interface 500, the gaze direction stimulus generator 304 may generate the example stimulus 400 illustrated in FIG. 4 and provide the stimulus 400 to the gaze direction modulator 306 of FIG. 3. In some examples, the gaze direction stimulus generator 304 generates the stimulus 400 based on a sample value of a flicker waveform. The gaze direction modulator 306 then modulates the video content with the stimulus. The modulation results in the example display interface 500 as illustrated in FIG. 5, where the area 502 has a higher luminance than the other regions of the display interface 500.

At a second time the gaze direction stimulus generator 304 determines a second sample value of the flicker waveform to generate a second stimulus, and the gaze direction modulator 306 then modulates the video content with the second stimulus in the display interface 500, which causes a change in the luminance of the area 502. For example, if the second stimulus has a lower luminance in the same area that the first stimulus has a higher luminance, the gaze direction modulator 306 modulates the video content with a second stimulus to cause the area 502 to have a lower luminance than the other regions of the display interface 500. The example second time may, for example, be between 8.33 milliseconds (ms) and 16.67 ms after the first time illustrated in FIG. 5 (e.g., corresponding to a refresh rate of the display device 122 of 60 Hz-120 Hz). However, the second time may occur at other times relative to the first time based on the flicker waveform, the refresh rate of the display device 122, and/or the frequency at which the luminance of the area 502 of the display interface 500 is changed (e.g., by the gaze direction stimulus generator 304 and the gaze direction modulator 306).

To accomplish the change in luminance, the example gaze direction stimulus generator 304 changes the luminance of the area 502 while maintaining the luminance of the other regions of the display interface 500. The gaze direction stimulus generator 304 may perform this change by generating the example stimulus 400 of FIG. 4 at the first time, followed by a second example stimulus (e.g., a stimulus having a different luminance in the area 402) at the second time, and then generating a third stimulus similar or identical to the example stimulus 400 of FIG. 4 at a third time. This change causes the area 502 to appear to flicker in a manner that is readily detectable by human peripheral vision but is less detectable or imperceptible to human foveal vision. The flicker causes a person viewing the display interface 500 to direct his or her attention to the area 502 (e.g., the video feed 202a, the presenter 504) without realizing why his or her attention was drawn to the area 502.

The gaze direction stimulus generator 304 and the gaze direction modulator 306 may alternate the example area 502 of the display interface 500 between a higher luminance and a lower luminance to direct attention to the video feed 202a and/or to the presenter 504.

Figure 6:
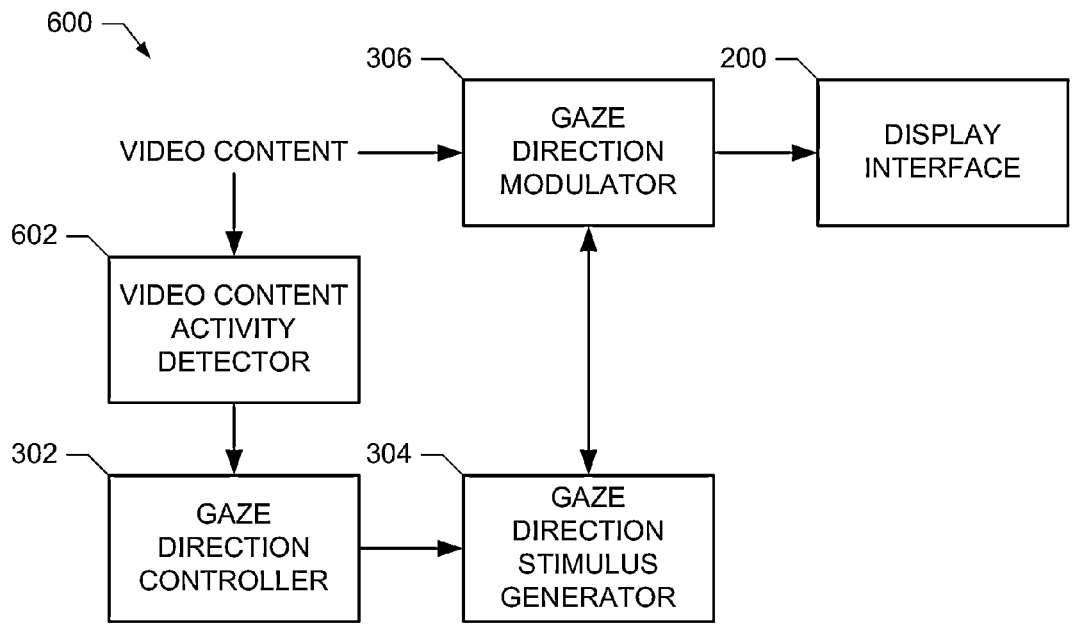
FIG. 6 is a block diagram of an example video content presentation device to direct attention in a display interface based on detecting activity in received video content.

FIG. 6 is a block diagram of an example video content presentation device 600 to direct attention in a display interface based on detecting activity in received video content. The video content presentation device 600 illustrated in FIG. 6 may be used to implement any of the example video content presentation devices 104a-104f, and includes the example gaze direction controller 302, the example gaze direction stimulus generator 304, the example gaze direction modulator 306, and the example display interface 200 of FIG. 3.

The example video content presentation device 600 further includes a video content activity detector 602. The video content activity detector 602 receives the video content (e.g., from other video content presentation devices 104a-104f via the network 106 of FIG. 1), detects activity in the video content, and provides the gaze direction controller 302 with information that may be used to determine where to direct a user's attention. In particular, the video content activity detector 602 may detect activity based on any one or more of audio content accompanying the video, relatively high amounts of motion indicative of a speaker's motions, motion in an area of the video where a speaker's mouth is expected to be located and/or has been determined to be located, a visual indicator accompanying the video and indicating a particular person in a presentation choreography at a predetermined time, etc. Any of these or other factors may be weighted to determine activity in the video content that is most likely to be an area of interest.

The gaze direction controller 302 receives the detected activity location(s) from the video content activity detector 602 and determines a gaze direction location based at least in part on the detected activity location(s). While the detected activity location may often be the gaze direction location, the gaze direction controller 302 may determine instead that the activity location should be overridden by other locations in the display interface 200. For example, an alert may occur while there is a detected activity, and the gaze direction controller 302 may direct attention to the location of the alert in the display interface 200 for a time before directing attention back to the location of the detected activity.

The gaze direction stimulus generator 304 generates the stimulus and the gaze direction modulator 306 modulates the video content with the stimulus as described above. The display interface 200 then displays the video content, including (e.g., modulated with) the stimulus. In some examples, the display interface 200 displays the video content modulated with the stimulus based on an application (e.g., a video conferencing application, a video player application, etc.)

Figure 7:
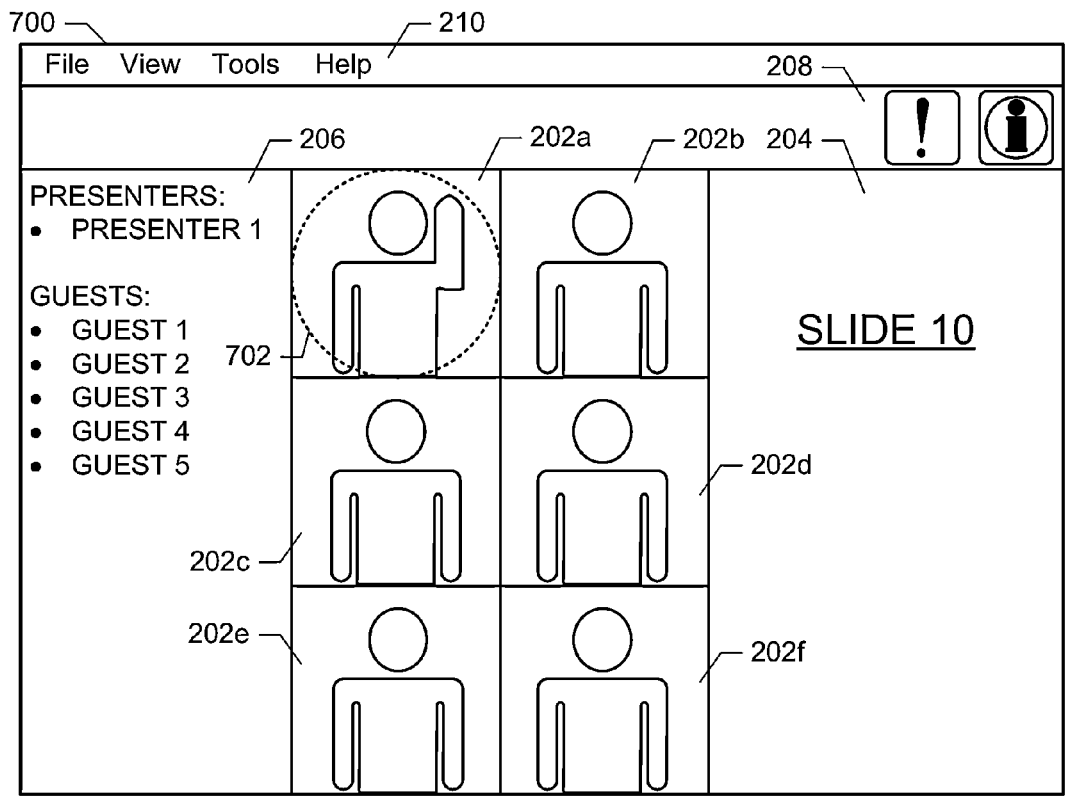
FIG. 7 illustrates an example display interface to direct attention using the example video content activity detector of FIG. 6.

FIG. 7 illustrates an example display interface 700 to direct attention using the example video content activity detector 602 of FIG. 6. The example display interface 700 may implement the display interface 200 of FIGS. 2 and 6, and includes the video feeds 202a-202f, the control window 204, the status window 206, the actions menu 208, and the toolbar 210. In the illustrated display interface 700 of FIG. 7, the video feed 202a has a user (e.g., the user 102a) who is moving in a manner to cause the video content activity detector 602 of FIG. 6 to detect activity in the received video content corresponding to the video feed 202a. The video content activity detector 602 provides the detected activity location (e.g., identifies the video feed 202a) to the gaze direction controller 302, which identifies the location of the video feed 202a to the gaze direction stimulus generator 304. The gaze direction stimulus generator 304 then generates a stimulus, which is illustrated in FIG. 7 as an area 702. Over time, the luminance of the area 702 changes at a modulation frequency of 30 Hz or higher as described above. The gaze direction modulator 306 receives the video content, modulates the video content with the stimulus (e.g., the changes in the luminance of the area 702), and displays the modified video content in the display interface 700.

Figure 8:
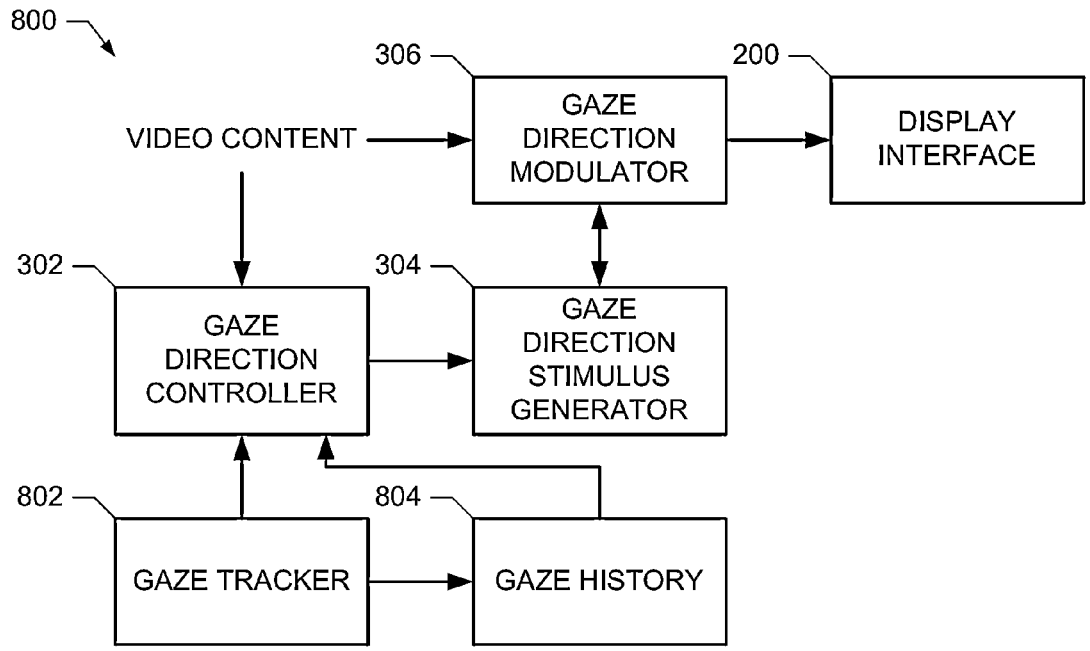
FIG. 8 is a block diagram of an example video content presentation device to direct attention in a display interface using a gaze tracker and a gaze history.

FIG. 8 is a block diagram of an example video content presentation device 800 to direct attention in a display interface 200 using a gaze tracker 802 and a gaze history 804. The example video content activity detector 800 includes the example gaze direction controller 302, the example gaze direction stimulus generator 304, the example gaze direction modulator 306, and the example display interface 200 of FIG. 3. The example video content activity detector 800 further includes the example gaze tracker 802 of FIG. 8 and the gaze history 804. The video content activity detector 800 may use the gaze history 804 to determine locations of interest to a user in received video content, in the display interface 200, and/or in a video content application.

While known attention directing systems use gaze tracking, the known systems use the gaze tracking to determine when to remove an attention-drawing stimulus. In contrast, the example video content activity detector 800 may use the gaze tracker 802 and/or the gaze history 804 to determine a location or area to which attention should be drawn.

As the gaze tracker 802 identifies the gaze directions of a user, the gaze tracker 802 provides the gaze directions to the gaze history 804. The gaze history 804 maintains a history or log of the gaze locations of a user of the display interface 200. The gaze history 804 may maintain the history for any amount of time, such as a brief period prior to the start of a video content session (e.g., prior to a video conference), an entire video content session, and/or all previous video content sessions. At least a portion of the gaze history 804 is provided to the gaze direction controller 302, which identifies regions of interest based on the gaze history 804.

Based on the gaze history 804, the gaze direction controller 302 may identify regions of interest to the user. For example, the gaze direction controller 302 may determine that multiple fixations in a particular location of the display interface 200 are indicative of interest by the user in that particular location (or in an item of the display interface 200 currently displayed in that particular location). The gaze direction controller 302 may further determine that the user is interested in a particular location of the display interface 200 by comparing the user's fixation locations to locations where the gaze direction controller 302 is directing attention. If fixations in the gaze history 800 are at or near a particular location often and/or long enough, the gaze direction controller 302 may determine that the user is interested in a particular location or feature (e.g., video feed 202a-202f). When the gaze direction controller 302 is determining where to direct attention in the display interface 200, the gaze direction controller 302 may consider the user's locations of interest.

Figure 9A:
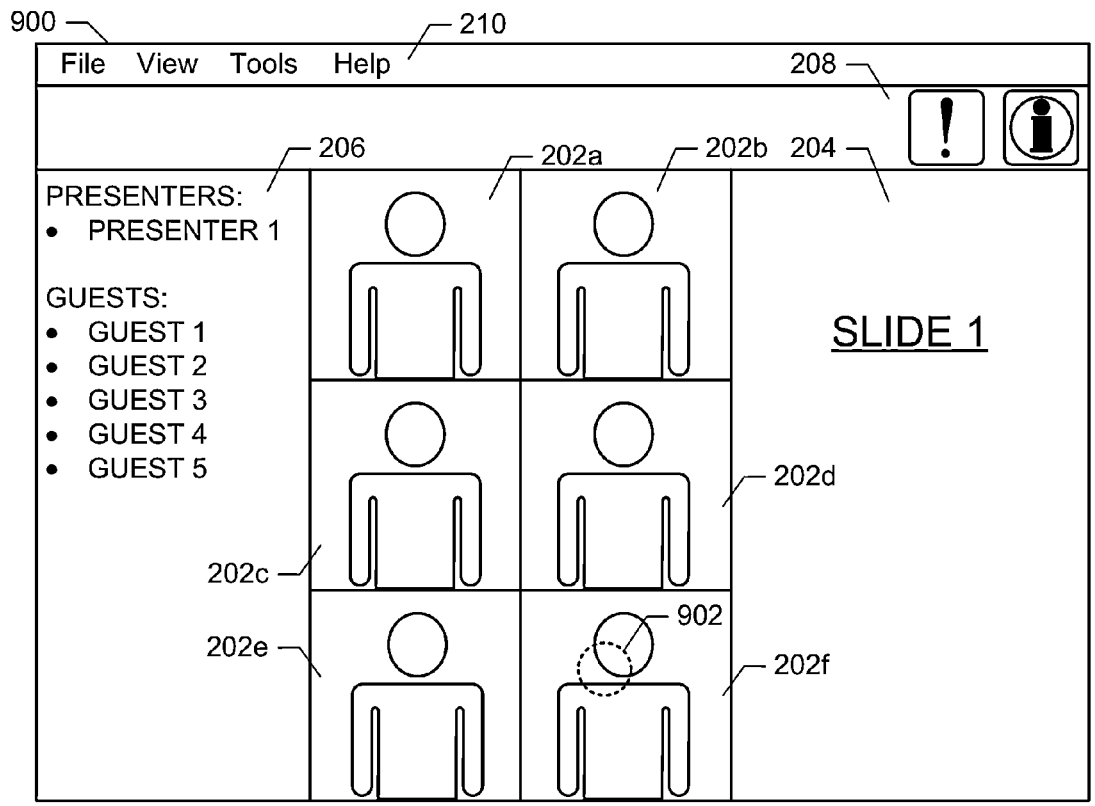
FIG. 9A illustrates an example of determining a gaze history in a display interface.

FIG. 9A illustrates an example of determining a gaze history in a display interface 900. The example display interface 900 may implement the display interface 200 of FIGS. 2 and 6, and includes the video feeds 202a-202f, the control window 204, the status window 206, the actions menu 208, and the toolbar 210. The display interface 900 of FIG. 9A further illustrates an identified fixation point 902, which is identified and added to the gaze history 804 of FIG. 8 by the gaze tracker 802 at a first time. Based on the fixation point 902, the gaze direction controller 302 determines that the user is interested in the video feed 202f, and uses the interest to direct attention to the video feed 202f when appropriate (e.g., when the video feed 202f has some activity or an alert).

Figure 9B:
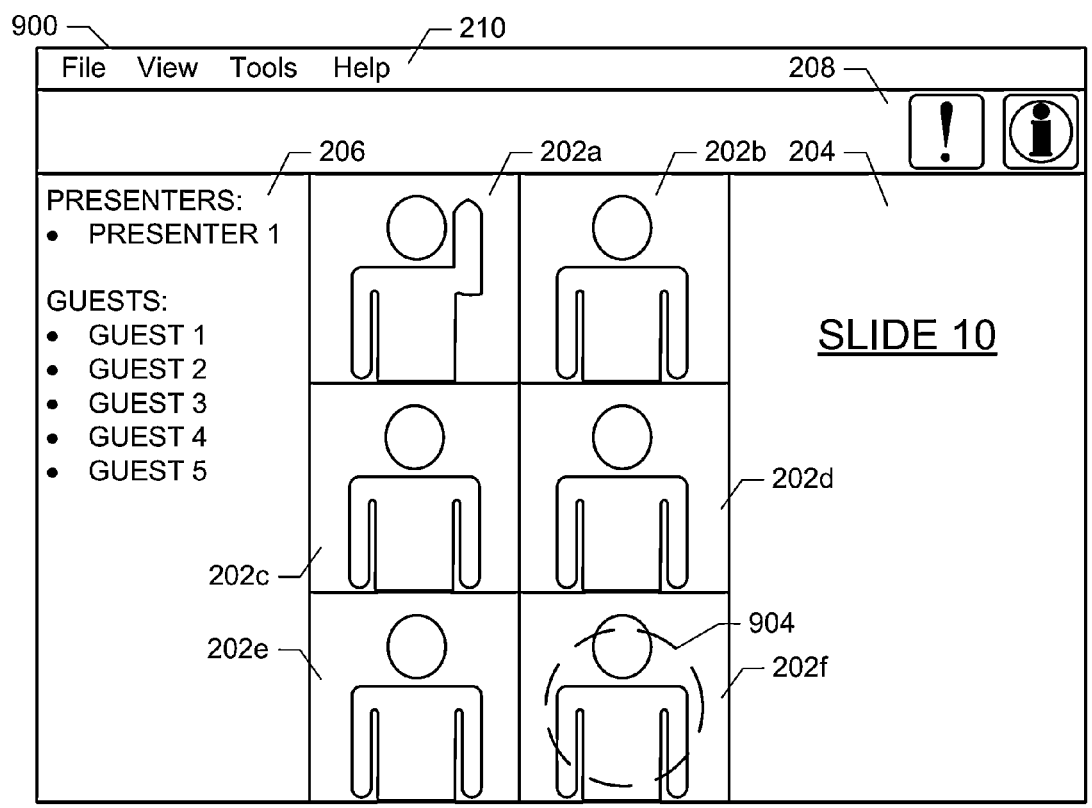
FIG. 9B illustrates an example of directing attention in the display interface of FIG. 9A based on a gaze history.

FIG. 9B illustrates an example of directing attention in the display interface 900 of FIG. 9A based on a gaze history (e.g., the gaze history 804 of FIG. 8). The illustrated display interface 900 in FIG. 9B is shown at a second time after the time illustrated in FIG. 9A. In particular, the example display interface 900 includes an area 904 generated by the video content presentation device 800 of FIG. 8. Video content may be modulated with a stimulus (e.g., the example stimulus 400) to subtly draw a user's attention to the area 904. To determine the location of the area 904, the example gaze history 804 (including at least the fixation point 902 of FIG. 9A) is provided to the gaze direction controller 302. The gaze direction controller 302 determines a gaze direction location based on the gaze history 804. In some examples, the gaze direction controller 302 may further consider other factors such as detected activity in the video content (e.g., generated by the video content activity detector 602 of FIG. 6).

The gaze direction controller 302 provides the gaze direction location (e.g., based on the gaze history 804 and/or the fixation point 902) to the gaze direction stimulus generator 304. The gaze direction stimulus generator 304 generates a gaze direction stimulus (e.g., the stimulus 400 of FIG. 4) and provides the stimulus to the gaze direction modulator 306, which modulates the video content with the stimulus and displays the modulated video content via the display interface 900. The location of the example area 904 illustrated in FIG. 9B is based on the gaze history 804 (e.g., the fixation 902 of FIG. 9A), although the video feed 202a includes activity and may include a location to which attention would be directed but for the gaze history 804 and/or the interest determined by gaze direction controller 302.

While the example gaze history 804 of FIG. 8 is shown in FIGS. 9A and 9B as overriding the activity in the video feed 202a, the gaze direction controller 302 may weight the gaze history 804 to reflect the relative importance of different activities in the video content, detected activity in the video content, alarms and/or alerts, scheduled content (e.g., a video conference choreography), and/or any other factors. The weights may be based on, for example, empirical observations of a person's interest in content in a video display and/or frequencies and/or lengths of fixations on content on a video display.

Figure 10:
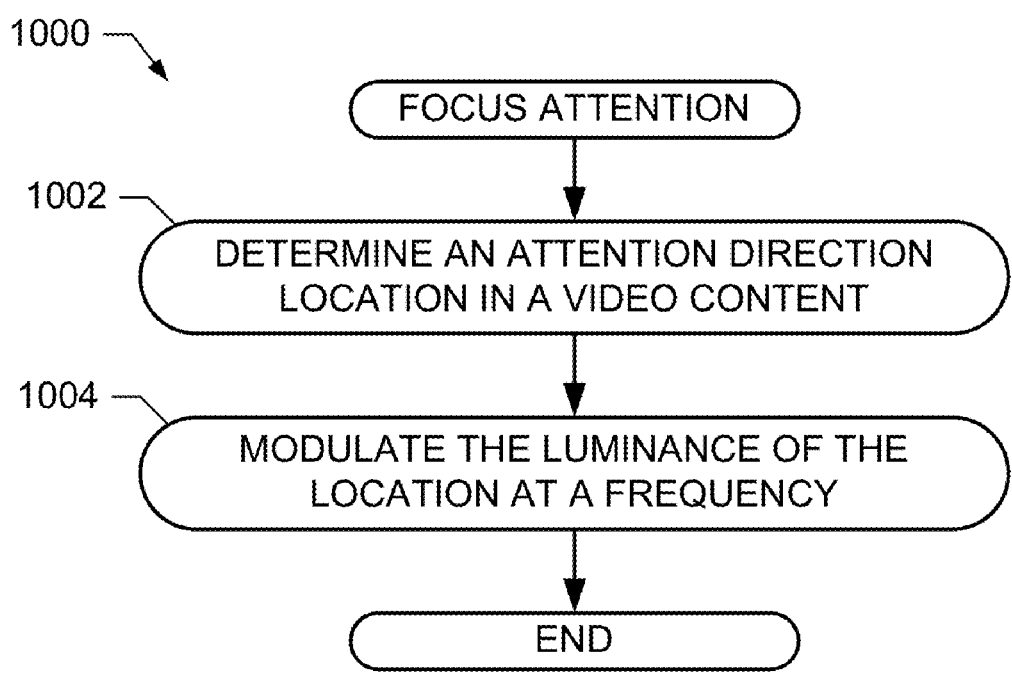
FIG. 10 is a flowchart illustrating an example method to direct attention to a region in a display interface.

FIG. 10 is a flowchart illustrating an example method 1000 to direct attention to a region in a video display interface. The example method 1000 may be used to implement the example video content presentation devices 104a-104f, 300, 400, 600, or 800, and/or by the example processing system 108 of FIG. 1B.

The example method 1000 of FIG. 10 begins by determining (e.g., via the gaze direction controller 302 of FIGS. 3, 6, and 8) an attention direction location (e.g., area and/or portion) of an image in a video content (e.g., the display interface 200 of FIG. 2) (block 1002). The gaze direction controller 302 may determine the attention direction location based on, for example, an alarm or alert generated by the display interface 200 (e.g., a timer), a predetermined presentation choreography, activity detected in received video content (e.g., from the video content activity detector 602 of FIG. 6), prior gaze information (e.g., the gaze history 802 of FIG. 8), and/or any other factors. An example method 1100 to perform block 1002 is described in more detail below in conjunction with FIG. 11.

After determining a location (block 1002), the example gaze direction stimulus generator 304 and/or the example gaze direction modulator 306 of FIGS. 3, 6, and 8 modulate the location of the video content with a stimulus (e.g., the example area 502 of FIG. 5, the example area 702 of FIG. 7, the example area 904 of FIG. 9B) at a frequency (block 1004). The modulation of the video content with the stimulus may result in, for example, a luminance flicker effect in the area when viewed by human peripheral vision. The example frequency may be based on, for example, the refresh rate of the display interface 200 of FIGS. 2, 3, 5, 7, 9A, and 9B or the display device 122 of FIG. 1B. An example method 1200 to perform block 1004 is described in more detail in FIG. 12. The video content presentation device 104a-104f, 300, 400, 600, or 800, and/or the processing system 108 may then end the example method 1000. In some examples, the method 1000 may iterate to direct attention to the same or a different region in a display interface.

Figure 11:
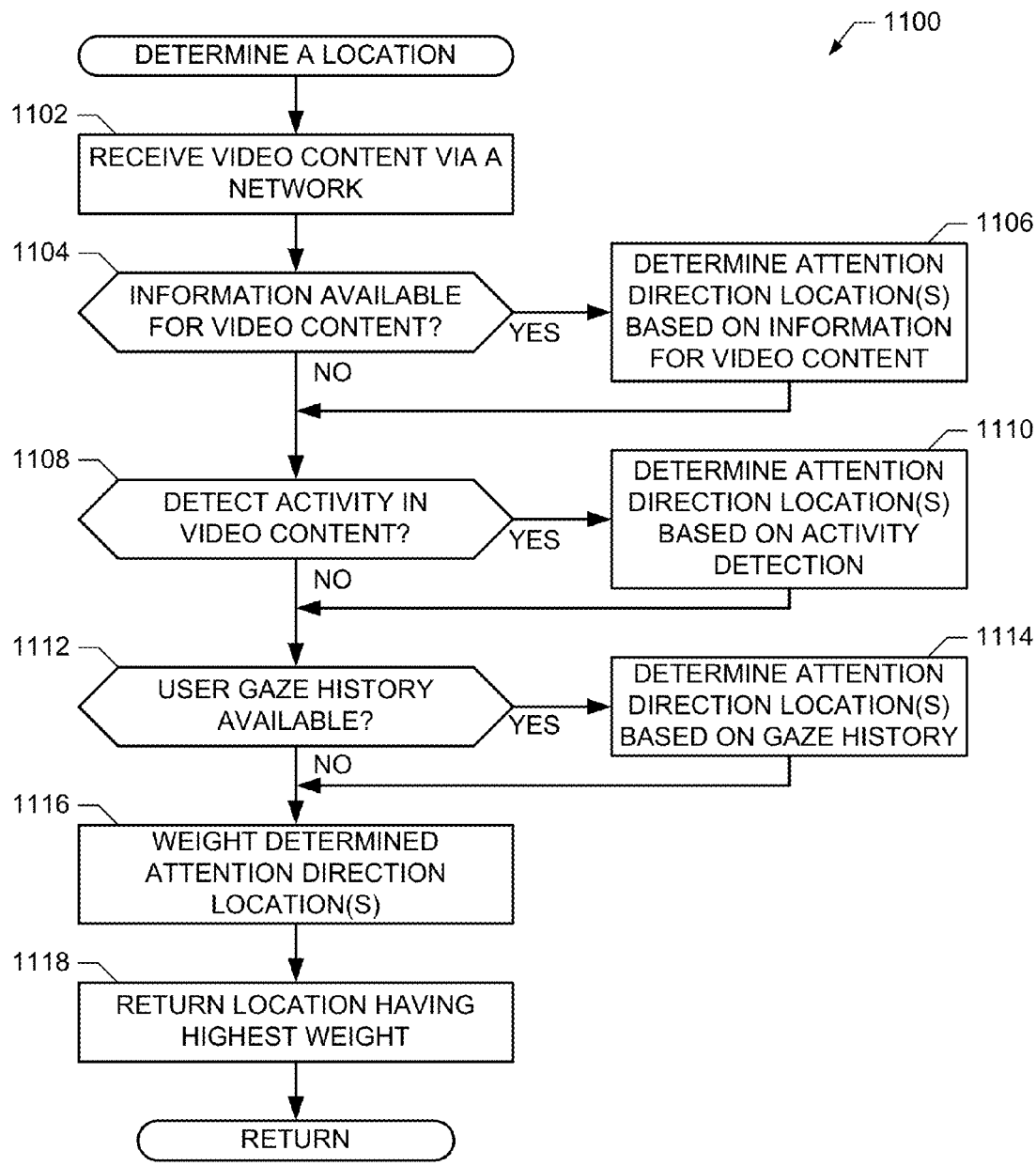
FIG. 11 is a flowchart illustrating an example method to determine a location in an image.

FIG. 11 is a flowchart illustrating an example method 1100 to determine a location to which attention is to be drawn in an image or video content. The example method 1100 may be used to implement the example video content presentation devices 104a-104f, 300, 400, 600, or 800, the example gaze direction controller 302 of FIGS. 3, 6, and 8, and/or the example processing system 108 of FIG. 1B to perform block 1002 of the example method 1000 of FIG. 10. Because the features of the example video content presentation devices 104a-104f, 300, 400, 600, or 800 may be used in different combinations, the example method 1100 will be described with reference to one of the video content presentation device(s) 104a-104f.

The example video content presentation device 104a receives video content (e.g., from other video content presentation devices 104b-104f of FIG. 1) via a network (e.g., the Internet 106) (block 1102). The example video content presentation device 104a (e.g., via the gaze direction controller 302) determines whether activity information is available for the video content (block 1104). Example information may include a predetermined presentation choreography for the video content, including which users, presenters, and/or attendees are scheduled to speak at a particular time. However, the gaze direction controller 302 may determine other information corresponding to the video content. If there is activity information available for the video content (block 1104), the example gaze direction controller 302 determines attention direction location(s) based on the information for the video content (block 1106). For example, the gaze direction controller 302 may determine a particular video feed (e.g., the video feed 202a of FIG. 2) as an attention direction location in the display interface 200 of FIG. 2 based on a presentation choreography.

After determining attention direction location(s) based on the information (block 1106), or if there is no activity information for the video content (block 1104), the example video content presentation device 104*a* (e.g., via the video content activity detector 602) attempts to detect activity in the video content (block 1108). If the video content activity detector 602 detects activity in the video content (block 1108), the gaze direction controller 302 determines attention direction location(s) based on the detected activity (block 1110). For example, the gaze direction controller 302 may receive an indication of video feed(s) 202*a*-202*f* that include activity from the video content activity detector 602. The gaze direction controller 302 may then determine the location(s) corresponding to the video feed(s) 202*a*-202*f* having activity.

After determining location(s) based on activity detection (block 1110), or if there is no detected activity (block 1108), the video content presentation device 104*a* determines whether a gaze history (e.g., the gaze history 802 of FIG. 8) is available (block 1112). If the gaze history 802 is available (and pertinent to the video content) (block 1112), the gaze direction controller 302 determines attention direction location(s) based on the gaze history 802 (block 1114). For example, the gaze direction controller 302 may determine that a user is interested in a particular one of the video feeds 202*f* and determine an attention direction location based on the location of the video feed 202*f*.

After determining attention direction location(s) based on the gaze history 802 (block 1114), or if there is no available gaze history (block 1112), the example gaze direction controller 302 weights the attention direction location(s) determined in blocks 1106, 1110, and/or 1114 (block 1116). The weights may be based on any combination of application-specific, user-specific or universal, static or dynamic, and/or any other weighting factor and/or scheme. In some examples, the weights are determined based on empirical observations of applications, users, and/or display interfaces to determine advantageous weighting scheme(s) that direct a user's attention to events or locations in which the user is interested. The gaze direction controller 302 provides or returns the highest (or lowest) weighted location (e.g., to the gaze direction stimulus generator 304 of FIGS. 3, 6, and 8) (block 1118). The example method 1100 may then end and return control to block 1004 of FIG. 10.

Figure 12:
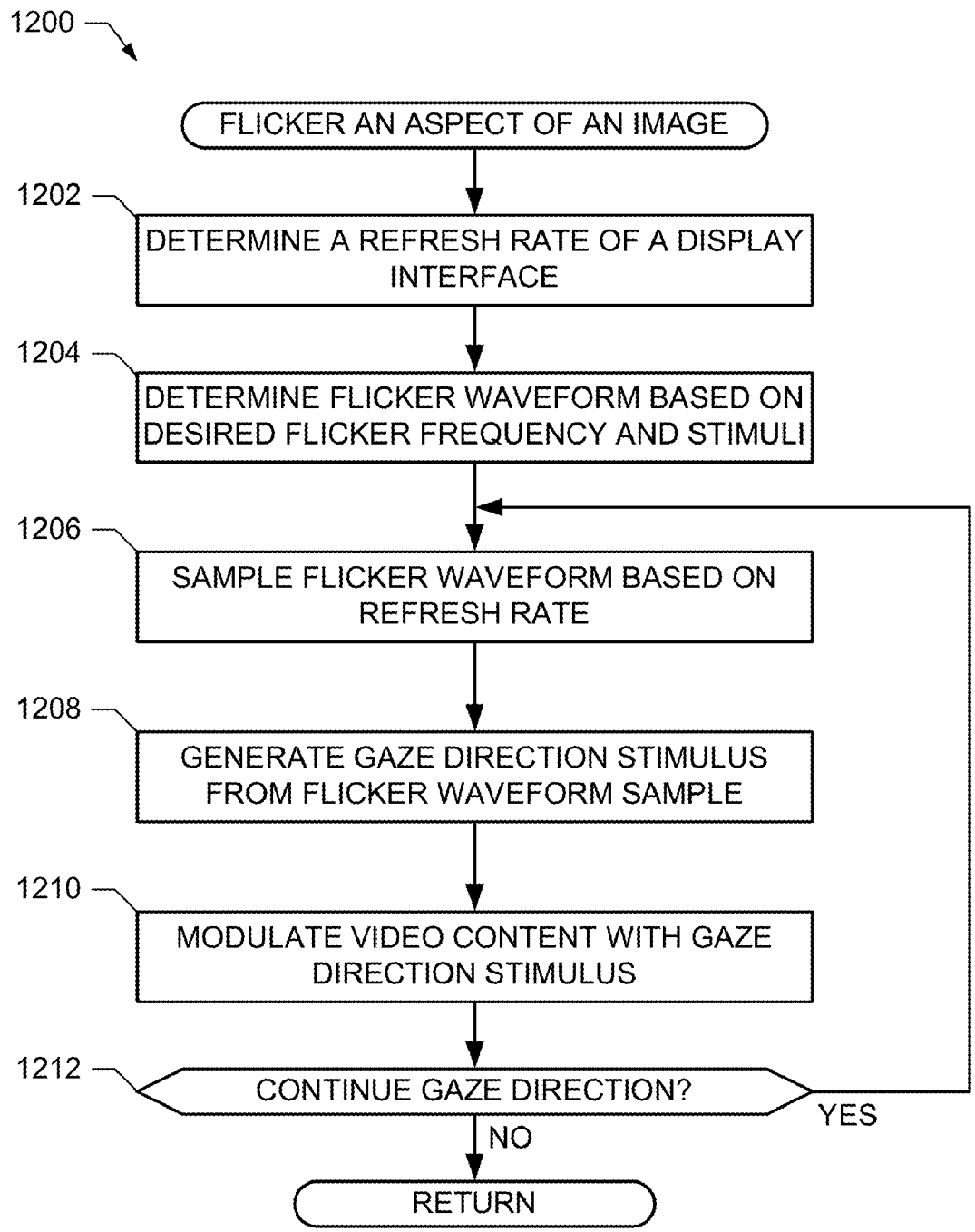
FIG. 12 is a flowchart illustrating an example method to modulate video content with a stimulus.

FIG. 12 is a flowchart illustrating an example method 1200 to modulate (e.g., flicker) video content with a stimulus. The example method 1200 may be used to implement the example video content presentation devices 104*a*-104*f*, 300, 400, 600, or 800, and/or by the example processing system 108 of FIG. 1B to perform block 1004 of the example method 1000 of FIG. 10. The example method 1200 will be described below with reference to the example graph 1300 of FIG. 13.

The example method 1200 may enter from block 1002 of FIG. 10, and determine (e.g., via the gaze direction stimulus generator 304 of FIGS. 3, 6, and 8) a refresh rate of a display interface (e.g., the display interface 200 of FIG. 2, the display device 122 of FIG. 1B) (block 1202). The refresh rate of the display interface 200 or display device 122 may be expressed in frames per second, or the number of images the display interface or display device 122 may display in one second. The example method 1200 will be described herein using an example refresh rate of 60 Hz. However, other refresh rates may be used with the example methods and apparatus.

Figure 13:
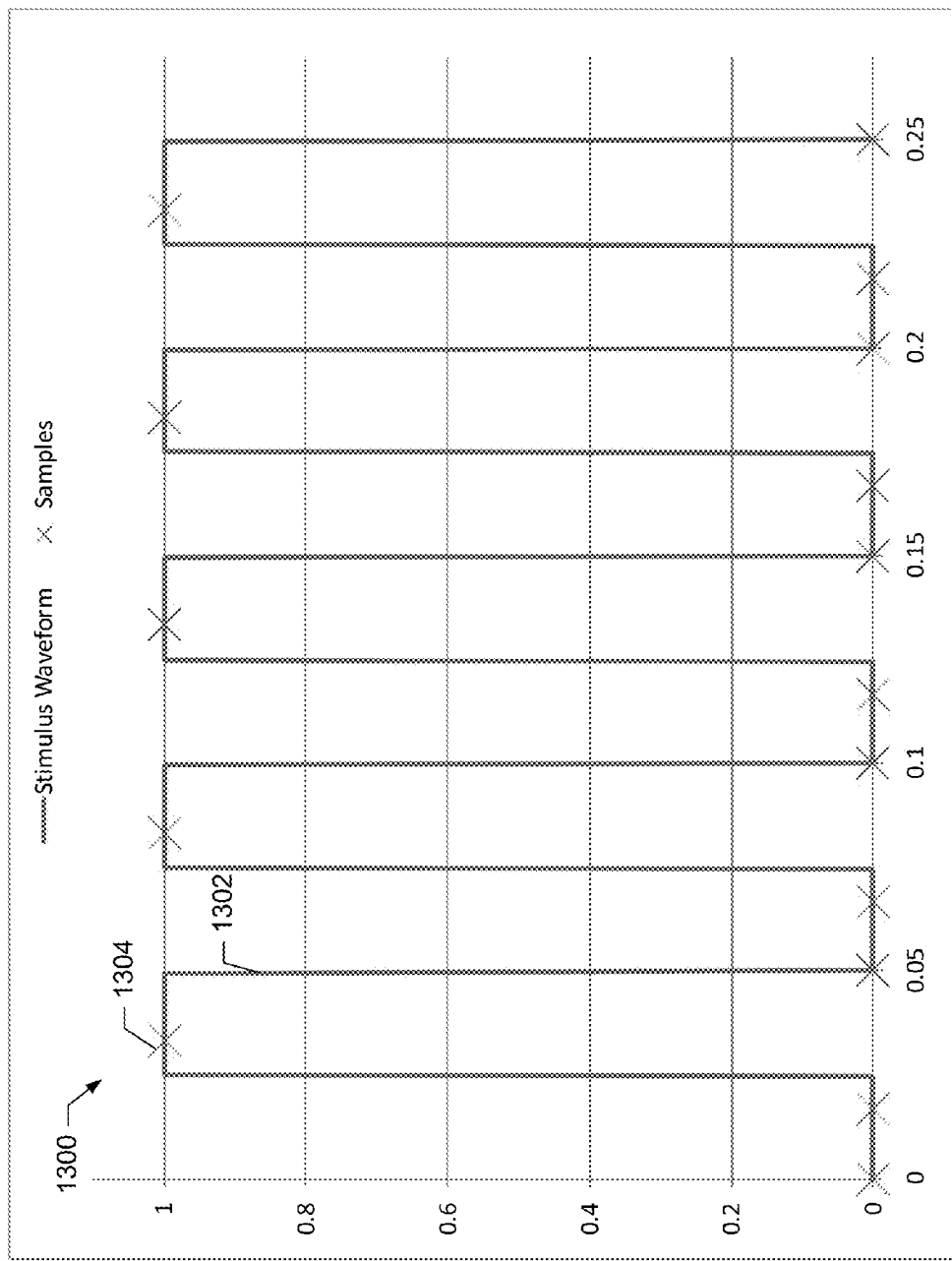
FIG. 13 is a graph of an example flicker waveform and several flicker waveform samples based on a display refresh rate.

The gaze direction stimulus generator 304 further determines a flicker waveform based on a desired flicker frequency (e.g., between 30 and 70 Hz) (block 1204). In some examples, the waveform is representative of the flicker to be applied to generate the gaze direction stimulus. For example, a square flicker waveform may represent two luminance states, a sine waveform may represent a continuum of luminance states, etc. The example flicker waveform 1302 of FIG. 13 is a 40 Hz square waveform that changes between two luminance states, which are represented by 1 (e.g., high luminance) and 0 (e.g., low luminance).

The gaze direction stimulus generator 304 samples the flicker waveform 1302 based on the refresh rate (block 1206). For example, the gaze direction stimulus generator 304 may determine a sample value 1304 of the flicker waveform $\frac{1}{60}^{th}$ of one second after a previous sample for a 60 Hz refresh rate. The gaze direction stimulus generator 304 then generates a gaze directions stimulus from the flicker waveform sample (block 1208). In the illustrated example of FIG. 13, the gaze direction stimulus generator 304 generates a gaze direction stimulus having a higher luminance in the stimulus area corresponding to the sample value 1304 of 1. The gaze direction modulator 306 modulates the video content with the gaze direction stimulus (block 1210).

The gaze direction stimulus generator 304 determines whether to continue gaze direction (block 1212). If the gaze direction is to continue (block 1212), control returns to block 1206 to sample the flicker waveform. On the other hand, if gaze direction is to change or stop (block 1212), the example method 1200 may end and control returns to the example method 1000 of FIG. 10.

In some cases, a display interface or display device is not initially configured with a sufficient refresh rate to produce a modulation frequency within a desired range. In these cases, the video content presentation device 104*a* may change the refresh rate of the display interface 200 or the display device 122 to obtain an acceptable refresh rate such that the display interface or the display device 122 may achieve a refresh rate within the desired range.

In view of the foregoing, it should be apparent that the example methods and apparatus described herein may be advantageously used to subtly direct the focus of a viewer to a particular part of a video display interface. Users may find the flow of the video experience more focused and less distracting because they will naturally look at the right place at the right time. Advantageously, the appearance of the video conference interface appears natural because the gaze direction of the user is influenced by drawing attention without conscious awareness by the user. Additionally, when automatic activity detection results in drawing attention to an incorrect or less interesting location in a display interface, the user is not distracted by an overt attention-drawing technique and may freely redirect his or her attention. Further, the example methods and apparatus may be implemented without requiring eye tracking equipment to avoid user awareness of the attention direction. While known systems use an eye tracker to determine when to remove a stimulus such that a person does not identify the stimulus instead, the example methods and apparatus may be implemented on substantially any display interface having a refresh rate sufficient to achieve subtle attention direction.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method to direct attention in a video content display, comprising:
   determining a location in a display interface to which attention is to be directed based on video content to be displayed; and modulating with a stimulus, at a frequency such that the stimulus is detectable by human peripheral vision and is less detectable by human foveal vision, a portion of the video content displayed in the location with a stimulus to direct attention to the location.

2. A method as defined in claim 1, wherein the frequency is greater than or equal to 30 Hertz.

3. A method as defined in claim 1, wherein the frequency is less than or equal to 70 Hertz.

4. A method as defined in claim 1, wherein determining the location is based on at least one of detected activity in the video content, an alarm, an alert, a gaze history, or information associated with the video content.

5. A method as defined in claim 1, wherein modulating the portion of the video content comprises changing the luminance of the portion to create a luminance flicker effect.

6. A method as defined in claim 1, wherein modulating the video content with the stimulus comprises:
   determining a refresh rate of a display interface;
   generating first and second gaze direction stimuli;
   combining the first gaze direction stimulus with the video content for a first time based on the refresh rate and the frequency; and
   combining the second gaze direction stimulus with the video content for a second time based on the refresh rate and the frequency.

7. A method to direct attention in a video content display, the method comprising:
   determining a first participant having a first image to which attention is to be directed in a video conferencing application shown in the video content display; and
   modulating the first image of the first participant with a first stimulus at a frequency such that the first stimulus is detectable by human peripheral vision and is less detectable by human foveal vision to direct attention to the first image of the first participant.

8. A method as defined in claim 7, wherein the frequency is greater than or equal to 30 Hertz.

9. A method as defined in claim 7, further comprising determining a second participant having a second image in the video conferencing application, ceasing modulating the first image of the first participant, and modulating the second image of the second participant with a second stimulus to direct attention to the second image of the second participant.

10. A method as defined in claim 9, wherein ceasing modulating the first image of the first participant is based on a predetermined choreography.

11. A method as defined in claim 7, wherein the first stimulus is not observable by a person viewing the first image with a foveal region of the person's eye.

12. A method as defined in claim 7, further comprising:
    monitoring an eye tracker to determine a location of interest in the video conferencing application; and
    modulating the location of interest with a second stimulus to direct attention to the location of interest.

13. An apparatus to direct attention in a video content display, the apparatus comprising:
    a display interface to display video content;
    a gaze direction controller to determine a first portion of the video content to which attention is to be directed;
    a gaze direction stimulus generator to generate a visual stimulus that is detectable by human peripheral vision and is less detectable by human foveal vision; and
    a gaze direction modulator to receive the video content, to modify the video content to include the visual stimulus, and to provide the modified video content to the display interface.

14. An apparatus as defined in claim 13, further comprising a gaze tracker to track a gaze and to provide information representative of the gaze to the gaze direction controller.

15. An apparatus as defined in claim 14, wherein the gaze direction controller determines the first portion of the video content based on the information representative of the gaze.

16. An apparatus as defined in claim 13, further comprising a video content activity detector to detect activity in the first portion of the video content and to provide information representative of the activity to the gaze direction controller.

17. An apparatus as defined in claim 16, wherein the gaze direction controller is to determine that attention is to be directed to the first portion of the video content based on the information representative of the activity.

18. An apparatus as defined in claim 16, wherein the gaze direction controller is to determine that attention is to be directed to a second portion of the video content based on weighting the information representative of the activity and second information.

19. An apparatus as defined in claim 13, wherein the gaze direction stimulus generator is to generate first and second gaze direction stimuli based on a location of the first portion.

20. An apparatus as defined in claim 19, wherein the gaze direction modulator is to combine the first gaze direction stimulus with the video content for a first time and combine the second gaze direction stimulus with the video content for a second time.

* * * * *